United States Patent [19]
Novak

[11] Patent Number: 5,744,406
[45] Date of Patent: Apr. 28, 1998

[54] METHOD FOR EASY REMOVAL OF FATS, OILS AND GREASE FROM MIXTURES WITH WATER AND AQUEOUS COMPONENTS

[76] Inventor: Robert J. Novak, 4720 Dartmouth Ave. N., St. Petersburg, Fla. 33713

[21] Appl. No.: 631,925

[22] Filed: Apr. 15, 1996

[51] Int. Cl.$^6$ .............................. E02B 15/04; C09K 3/32; B32B 5/00
[52] U.S. Cl. .............................. 442/121; 442/86; 442/90; 210/693
[58] Field of Search .............................. 442/121, 86, 90; 210/507, 505, 693, 924

[56] References Cited

U.S. PATENT DOCUMENTS

| Re. 31,087 | 11/1982 | Sohl | 210/671 |
|---|---|---|---|
| 2,114,393 | 4/1938 | Lane | 91/63 |
| 2,152,901 | 4/1939 | Manning | 154/33 |
| 3,764,527 | 10/1973 | Sohl | 210/30 |
| 4,072,794 | 2/1978 | Tomita et al. | 428/378 |
| 4,237,155 | 12/1980 | Kardouche | 427/242 |
| 4,519,918 | 5/1985 | Ericsson et al. | 210/680 |
| 4,587,154 | 5/1986 | Hotchkiss et al. | 442/121 X |
| 4,615,739 | 10/1986 | Clark et al. | 106/34 |
| 4,818,594 | 4/1989 | Albien et al. | 442/121 |
| 5,094,761 | 3/1992 | Trinh et al. | 252/8.9 |
| 5,186,831 | 2/1993 | De Petris | 210/242.4 |
| 5,234,610 | 8/1993 | Gardlik et al. | 252/8.6 |
| 5,348,667 | 9/1994 | Bacon et al. | 252/8.6 |
| 5,376,287 | 12/1994 | Borcher et al. | 252/8.8 |

OTHER PUBLICATIONS

Mag, T. K., "Bleaching—Theory and Practice", pp. 107–116.
Loft, Stanley C., "Deodorization—Theory and Practice", pp. 117–123.
Segers, J. C., et al., "Degumming—Theory and Practice", pp. 88–93.
Hendrix, B., "Neutralization I. Theory and Practice of Conventional Caustic (NaOH) Refining", pp. 94–100.
Cavanagh, G. C., Neutralization II: Theory and Practice of Non–Conventional Caustic Refining by Miscella Refining and by the Zenith Process, pp. 101–106.
Young, F.V.K., "Physical Refining", pp. 124–135.
Lusas, E. W., et al., "Separation of Fats and Oils by Solvent Extraction: Non–Traditional Methods", pp. 56–78.
Welsh, W. A., et al., "Silica Refining of Oils and Fats", pp. 189–201.
Lajara, J. R., "Solvent Extraction of Oil from Oilseeds: The Real Basics", pp. 49–55.
Book Review of "Edible Fats and Oils Processing: Basic Principles and Modern Practices", Erickson, D. R., ed., pp. 172 and 179, in Food Technology, Oct. 1991.

*Primary Examiner*—Daniel Zirker
*Attorney, Agent, or Firm*—Robert Platt Bell & Associates, P.C.

[57] ABSTRACT

A method for removing any single component or mixture of fats, oils and greases which have been added to or rendered out of an animal or vegetable product during cooking, thereby leaving the remaining commodity substantially fat-free without removing the water and water soluble flavor and nutrient salts. The product nearly instantaneously absorbs said fats, oils and greases onto a fabric substrate which is hydrophobic or repels water and oleophilic or attracts and absorbs hydrocarbons. The method works effectively on animal and vegetable fats, oils and greases through a temperature range from ambient or room temperature through boiling. The method removes fats, oils and greases from sauces, gravies, soups and any other cooking product regardless of type of cooking or type of fat, oil or grease and has the same removal effectiveness when used in waste treatment processes. The products are safe for use in microwaves. The discard able fabric substrate with the absorbed fats, oils and greases is biodegradable when used on cellulosic fabric substrate substrates or substrates which are biodegradable.

18 Claims, 5 Drawing Sheets

METHOD FOR EASY REMOVAL OF FATS, OILS AND GREASE FROM MIXTURES WITH WATER AND AQUEOUS COMPONENTS

FIELD OF THE INVENTION

The present invention relates to a fabric article treated for use in absorbing fats, oils and greases, and its method of manufacture. The fabric article, when applied to cooked food for absorption, acts oleophilic (i.e., absorbs oil) and hydrophobic (i.e., repels water) to preserve water, flavors, nutrients, and other aqueous components in the food mixture.

A particular method and process of treatment of a substrate fabric material produces the desired combination of oleophilic and hydrophobic properties of the fabric article for such intended use.

BACKGROUND OF THE INVENTION

High fat content in foods has been shown to be hazardous to health. In particular, high fat diets have been linked to heart disease and other pulmonary ailments. High fat diets may also result in weight gain, which may be aesthetically unpleasing and also a health hazard in and of itself.

Unfortunately, many low fat foods available may be lacking in essential flavors and textures which consumers have become accustomed to. Moreover, many traditional foods and ethnic cuisines may be high in fat content. It may be difficult to persuade consumers to abandoned such traditional or ethnic fare in favor of low fat foods.

Fat substitutes, such as Olestra® have been tried with some success. Unfortunately, such substitutes may have some disadvantages. For example, the Olestra® product is essentially undigestible by humans. If taken in large enough quantities, such fat substitutes may cause gastronomic distress. Moreover, many foods (e.g., meats and the like) contain naturally occurring fats which may be difficult or impossible to remove and substitute with artificial fat substitutes. Thus, it may be more desirable to remove fats, oils, and greases from foods during or after preparation rather than attempt to substitute such fats with artificially produced substances.

Sohl, U.S. Pat. No. 3,764,527, issued Oct. 9, 1973 and incorporated herein by reference, teaches the use of a synthetic fabric material for removing fatty components from soups, gravies, stews, and other cooking media for dietetic and aesthetic advantages (See, e.g., Sohl, Col. 4, lines 26–30). However, it appears that the synthetic fibers may leave significant grease residue due to incomplete absorption (See, e.g., Sohl, Col. 5, lines 55–60, where 11.93 grams of beef fat successfully removed out of the total of 20.25 grams of beef fat originally deposited).

Porous, fibrous materials have been well known to possess various filtering properties in early years of industrial development. Materials such as paper, cardboard, felt, cloth, sheet pulp, pulp board, flannel, etc. are common examples of early filtering substrate materials. For example, Lane U.S. Pat. No. 2,114,393, issued Apr. 19, 1938, and incorporated herein by reference, discloses a fibrous material which is impervious to fats, oils, greases, and other hydrocarbons.

While generally those materials were later championed as biodegradable, the initial problem with such substrate materials was lack of resilience during the life of intended use. Lane, for example, teaches one example of a method of preparing such substrate materials with esterified resin to render the substrate materials more resilient during their intended filtering uses.

Common employment of fabric materials for filtering uses during early years is also exemplified by a method of making filter fabric taught by Manning, U.S. Pat. No. 2,152,901, issued Apr. 4, 1939, incorporated herein by reference. Manning discloses various combinations of substrate cellulose/non-cellulosic fibrous materials (e.g., wool with asbestos). Such combinations of fibrous materials may be bonded by a coating process utilizing water, sodium silicate, silicate gel, or other commonly known adhesives.

In recent year, typical fabric materials have expanded to include synthetic compounds such as polyesters, polyamides, polycarbonates, polypropylene, polyethylene, polytriflourochloroethylene, and polytetrafluoroethylene. The uses for such fabric materials also expanded into such novel concepts as degreasing liquid food. Sohl teaches application of such a synthetic fabric material for removal of fatty components from soups, gravies, stews, and other cooking media for dietetic and aesthetic advantages (See, e.g., Sohl, Col. 4, lines 26–30). The advantages in the use of such synthetic fabric materials is the proven oleophilic (i.e., oil attracting) property along with the resilience of natural hydrophobic (i.e., water repelling) property of such synthetic materials in the absence of coatings or surface treatments.

However, one obvious disadvantage in the use of such synthetic fabric materials is the non-biodegradable nature of such synthetic materials upon use. Another disadvantage in the use of such synthetic fabric materials is the ever-present worry of leaching of synthetic compounds into food materials when a synthetic fabric material is applied to edible foods. Furthermore, there is no assurance that a heated food will have temperatures below the water boiling point, above which the properties of such materials may change. A third difficulty, as noted above, is that the synthetic fibers may leave significant grease residue due to incomplete absorption.

Clark et. al. U.S. Pat. No. 4,615,739, issued Oct. 7, 1986, discloses an oil-in-water-in-oil coating composition comprising an oil continuous phase comprising a solution of an oil soluble resin or drying oil in a water immiscible solvent, an aqueous discontinuous phase comprising an emulsion with a pH of about 4 to 10 of water insoluble resin in an aqueous medium, and an effective dispersing amount of a dispersing agent for dispersing the aqueous discontinuous phase in the oil continuous phase, and is incorporated herein by reference. The composition taught by Clark et. al. is sold commercially under the name Thompson's™ Water Seal™ Ultra as a waterproofing and weatherproofing coating. Clark et al. teach using this composition as a coating for weatherproofing and the like. Clark et. al. do not teach the use of their composition for the absorption of fats, oils, and greases.

Thus, it remains a requirement in the art to provide a more chemically neutral, better absorbing, and environmentally friendlier method for easy removal of fats, oils and greases from food mixtures containing water and aqueous components.

SUMMARY AND OBJECTS OF THE INVENTION

The present invention comprises a fabric substrate which may be treated with one or more components to make the fabric oleophilic and hydrophobic. Once treated, the fabric may be cut and/or formed for consumer or industrial use for removal of fats, oils, greases and the like in foods. In one embodiment, a small portion of such fabric may be immersed in a liquidous food material (e.g., soups, gravies, or the like) to remove fats, oils and greases, while leaving aqueous, nutritious, and flavoring components intact. In another embodiment, a portion of such fabric may be formed into a pillow or filter for use in straining gravies and the like (e.g., within a basting device). In yet another embodiment, a portion of fabric may be used to absorb greases from cooking solids (e.g., bacon in a microwave).

In the preferred embodiments, the fabric may comprise but is not limited to cellulosic materials such as paper, paper products and toweling, gauzes or cheesecloths; cellulose ethers such as cellulose acetate; and cellulose esters such as polyvinyl chloride, polyvinylidene chloride, polyethylene, polyesters, and polypropylene. Naturally water-absorbent fabrics may first be treated with a hydrophobic material, which in the preferred embodiment, may comprise paraffin and microcrystalline waxes. Naturally hydrophobic fabrics (e.g., polypropylene) may or may not be treated with this first hydrophobic material.

Either type of fabric may then be treated with an oleophilic material, in the preferred embodiment, an animal or vegetable wax, such as beeswax. The main component of beeswax is myricyl palamitate and may be used in an alternative embodiment as an oleophilic material. Both treatment materials may be suitable for use with food products and may have limited toxicity characteristics and be relatively stable once attached to the fabric. The coatings are kept from micro-cracking and sloughing off by a final resinous coating.

The fabric may be processed by first passing through a bath or spray of a first liquid which includes a solvent, water, and a first coating material. The fabric may then be passed through a bath or spray of a second liquid which includes a solvent, water, and a second coating material. The coatings may then be brushed or agitated into the interstices (the pore spaces) in the fabric and dried. Upon drying, the solvent may evaporate, leaving coating materials on the fabric. In alternative embodiments, a one step spray process may be used, or a third coating resin may also be applied.

DETAILED DESCRIPTION OF THE INVENTION

Figure 2:
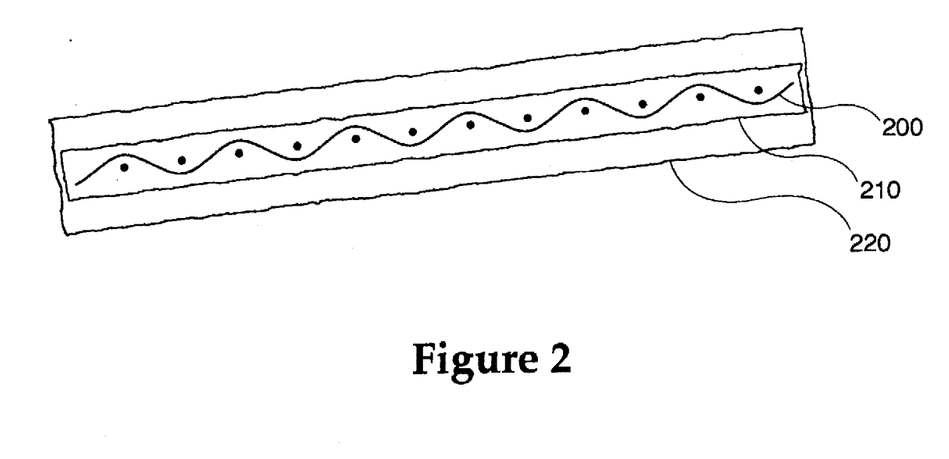
FIG. 2 is a diagram illustrating a cross-section of the device of the present invention, illustrating the coatings applied.

Referring now to FIG. 2, fabric substrate 200 is illustrated as coated with coatings 210 and 220. Fabric substrate 200 may comprise any number of types of fabric substrates, including, but not limited to cellulosic materials such as paper, paper products and toweling, gauzes or cheesecloths; cellulose ethers such as cellulose acetate; and cellulose esters such as polyvinyl chloride, polyvinylidene chloride, polyethylene, polypropylene, and polyesters. In FIG. 2, fabric substrate 200 is illustrated as a woven fabric substrate, however, it should be appreciated that fabric substrate 200 may comprise woven or non-woven (e.g., spunbond and thermal bond) fibers. Such materials may be food grade materials approved by the USDA and FDA.

Moreover, the thicknesses of coatings 210 and 220 may be somewhat exaggerated for purposes of illustration. In addition, although illustrated as two discrete layers, it will be appreciated from the description provided herein, that the two layers may not in practice have a discrete boundary region and in fact may form or be substituted by a single layer or applied in a single application.

Coatings 210 and 220 may surround fabric substrate 200 to prevent penetration of fabric surface by water or aqueous salts thereby allowing fabric substrate 200 to be nonabsorbent for water or soluble salts. Second coating 220 may be provided to prevent first coating 210 from dissolving and/or dispersing in mixtures of water, salts, fats, Oils and greases, nutrients and flavors while removing the fats, oils and greases from the mixture. In addition, second coating 220 may attract and entrap particles of fats, oils and greases on interstices and folds of fabric substrate 200 for the purposes of removal without removing other constituents in the mixture. In addition, both first coating 210 and second coating 220 may alter surface characteristics of fabric substrate 200 so it will generally float.

In instances where the characteristic of fabric substrate 200 vary, the order and composition of first and second coatings 210 and 220 may vary and/or possibly one or more coatings be eliminated. For example, polypropylene is naturally water repellant, therefore the hydrophobic coating may not be necessary.

The preferred coating materials in fabric substrate 200 coating process may comprise a mixture of substantially water-insoluble materials which are solubilized by volatile solvents. Typically, but not necessarily, the coating materials are selected from waxy materials such as paraffinic waxes, microcrystalline waxes, animal waxes, vegetable waxes and resins. These materials may be deposited on a fabric substrate 200 from a solvent-mix, which, after evaporation of the solvent gives non-toxic, inert, even coatings with superior protection to fabric substrate 200 to repel water, aqueous mixtures, salts and absorb fats, oils and greases from said mixtures. The treatment process can be performed effectively on a multitude of types of fabric substrate 200. Fabric substrate 200 may comprise but is not limited to cellulosic materials including hydrophilic fibers such as paper, paper products and toweling, gauzes or cheesecloths; cellulose ethers such as cellulose acetate; and cellulose esters such as polyvinyl chloride, polyvinylidene chloride, polyethylene and polypropylene. Fabric substrate 200 may be woven or not and may include spunbond, thermalbond, and/or mats. Coatings can be applied as a mixture of compounds in a single step or as a series of individual steps.

Figure 1:
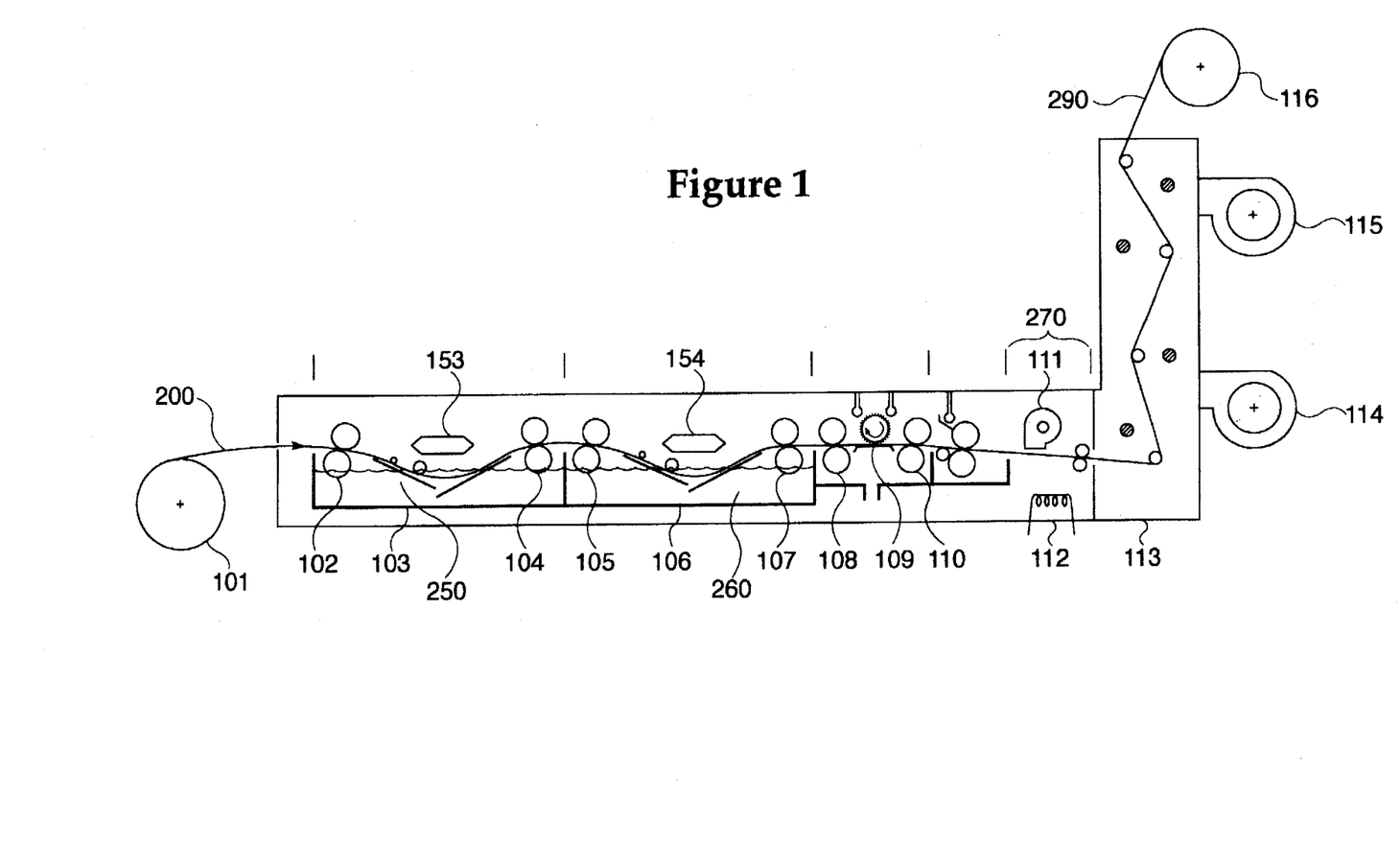
FIG. 1 is a diagram illustrating a first embodiment of the coating process of the present invention.

FIG. 1 illustrates an apparatus for manufacturing and the process for manufacturing the coated fabric of the present invention. In FIG. 1, Fabric substrate 200 may be provided in bulk form in roll 101. Fabric substrate 200 may then be fed through feed rollers 102 which serve to flatten and straighten fabric substrate 200. Fabric substrate 200, after passing through feed rollers 102, passes into first dip tank 103.

First dip tank 103 may contain a first coating solution 250 which may comprise a mixture of naphtha, paraffin, and water. In the preferred embodiment, first coating solution 250 may comprise 60 to 80% by volume of water, 8–10% by volume of naphtha, with the balance being paraffin or other hydrophobic coating material. First coating solution 250 may be alternately sprayed from a spray head 153 to coat fabric substrate 200. Fabric substrate 200 may then pass through feed rollers 104 which may remove excess amounts of first coating solution 250. Evaporation of the water and naphtha cause first coating solution to form first coating 210 on fabric substrate 200.

Feed rollers 105 further feed fabric substrate 200 into second dip tank 106. Second dip tank 106 may contain second coating solution 260, which may comprise a mixture of naphtha, beeswax, and water. In the preferred embodiment, second coating solution may comprise 60 to 80% by volume of water, 8–10% by volume of Naphtha, with the balance being beeswax or other oleophilic coating material. Second coating solution 260 may be alternately sprayed from a spray head 154 to coat fabric substrate 200. Fabric substrate 200 may then pass through feed rollers 107 which may remove excess amounts of second coating solution 260. Evaporation of the water and naphtha cause second coating solution to form second coating 220 on fabric substrate 200.

Feed rollers 108 serve to flatted and feed fabric substrate 200 past binder 109. Binder 109 rotates in a direction opposite of the feed of fabric substrate 200 to aggressively brush the two coating materials into interstitial spaces within fabric substrate 200. In the preferred embodiment, binder 109 may comprise a household paint roller or the like, with bristles provided for brushing the coating into fabric substrate 200.

After passing through binder 109, feed rollers 109 and 110 pass fabric substrate through first drying portion 270. First drying portion 270 may contain fan 111 and heating element 112. A second drying portion or duct 113 may be provided to further dry fabric substrate 200. duct 113 may be provided with a number of vents for accepting dry heated air from heating units 114 and 115. In a prototype of the preferred embodiment, heating units 114 and 115 may comprise simple consumer hair dryers. Take-up reel 116 may coil now coated fabric substrate 290.

Although illustrated in FIG. 1 as comprising two dip tanks 103 and 106, in the preferred embodiment, a single dip tank 103 may be used in conjunction with a single application of coating material, as discussed below.

A suitable prototype of the apparatus of FIG. 1 may be constructed from commercially available processing equipment. In the preferred embodiment of the prototype, an OPC450 Automatic Plate Processor manufactured by UNI-GRAPH corporation was suitably modified by adding second dip tank 106. For volume production, larger commercial equipment may be utilized.

Up to three coating layers may be applied. A third oleophilic resin (e.g., pine tar resin) may also be applied to bind fabric substrate 200. Alternately, hydrophobic and oleophilic coating materials may be applied in a single step process, in particular, by spraying a solution of such coating materials in water and solvent onto fabric substrate 200. Such a spray technique may reduce or eliminate the need for drying steps in the process.

In an alternative embodiment a solution may be sprayed onto fabric substrate 200 in a single-step process. Such a single-step spray process may not require the step of binding the solution to the fabric. In the single-step spray embodiment, a commercially available solution may be used. In particular, a product sold commercially as Thompson's® Water Seal® ULTRA (U.S. Dept. Labor chemical formula M050643), which includes a solution of 2.9 percent paraffin wax, 7.0 to 8.0 percent solvent naphtha with the balance being mostly water. Experiments performed using this solution have shown it to have superior hydrophobic and oleophilic properties when applied as a coating to a fabric substrate.

In yet another embodiment, a single-step oleophilic coating may be applied where the underlying fabric substrate 200 has inherent hydrophobic properties. For example a spunbond polypropylene fabric substrate 200 may have inherent hydrophobic characteristics, and thus may not require coating with a hydrophobic layer such as paraffin.

Regardless of which embodiment is employed, the general coating principles remain the same. In general, coating is accomplished by dissolving resin material and/or waxes in a volatile solvent like an alcohol or other low boiling point distillate, coating fabric substrate 200 and then evaporating the solvent. After evaporating the solvent and drying fabric substrate 200, coating(s) 210 and/or 220 become non-toxic and inert. Application can be by spraying, dipping, rolling or any other fabric substrate 200 coating technique.

Coating(s) 210, 220 surround and encapsulate fabric substrate 200 and are generally present from 0.5% to 30% by weight. This percentage can be higher or lower depending upon desired hydrophobic or water repelling characteristics for fabric substrate 200. Typically and preferably coating(s) 210 and/or 220 may be are about 0.5% to 5% by weight. Coating(s) 210 and/or 220 provide a moisture barrier to keep water and salts from penetrating the surface and being absorbed by fabric substrate 200.

Coating(s) 210 and/or 220 may also help prevent degradation of the surface characteristics of fabric substrate 200 like spalling, cracking or pitting during frequent and repeated wetting cycles, thereby allowing for reuse. This characteristic also has widespread use in the recovery of fats, oils and greases from grease receivers like grease traps and other industrial processes. Coating(s) 210 and/or 220 may comprise a mixture of waxy materials and polymeric resins from 0% to 100% waxy materials and 1000% to 0% polymeric resins.

Coating(s) 210 and/or 220 may have melting points high enough to not melt or soften and dissolve in the mixture of fats, oil, grease, water and salts. Coating(s) 210 and/or 220 may be resilient enough to not slough-off during the removal phase of the fats, oils and greases thereby contributing any foreign material(s) to the remaining mixture. Coating(s) 210 and/or 220 are rather ductile and generally do not fracture and break off into the fat, oil, grease, water and salt mixture during the removal process.

In use, coated fabric substrate 290 may be used one time and disposed of or may be reused. Coated fabric substrate 290 may be reused to perform continuous or multiple recoveries of fats, oils, and greases by simply wringing out the absorbed fats, oils, and greases and reapplying coated fabric substrate 290 to the mixture being treated or a new mixture to be treated. Coated fabric substrate 290 may be used in a continuous removal and/or recovery mode by manufacturing coated fabric substrate 290 in booms, belts nets or ropes and fasting the ends to form a loop and then passing coated fabric substrate 290 through a press to squeeze the fats, oils, and greases from coated fabric substrate 290.

If it is desirable to improve the aesthetic characteristics of the deposit on fabric substrate 200, masking adjuvant can be applied without adverse effects on the absorption qualities of coated fabric substrate 290. Such perfumes may be added to provide olfactory aesthetic benefit and make coated fabric substrate 290 is clean smelling. However, it should be noted that in the preferred embodiment, no perfumes may be necessary, as the natural scent of beeswax may be quite aesthetically pleasing.

Figure 3:
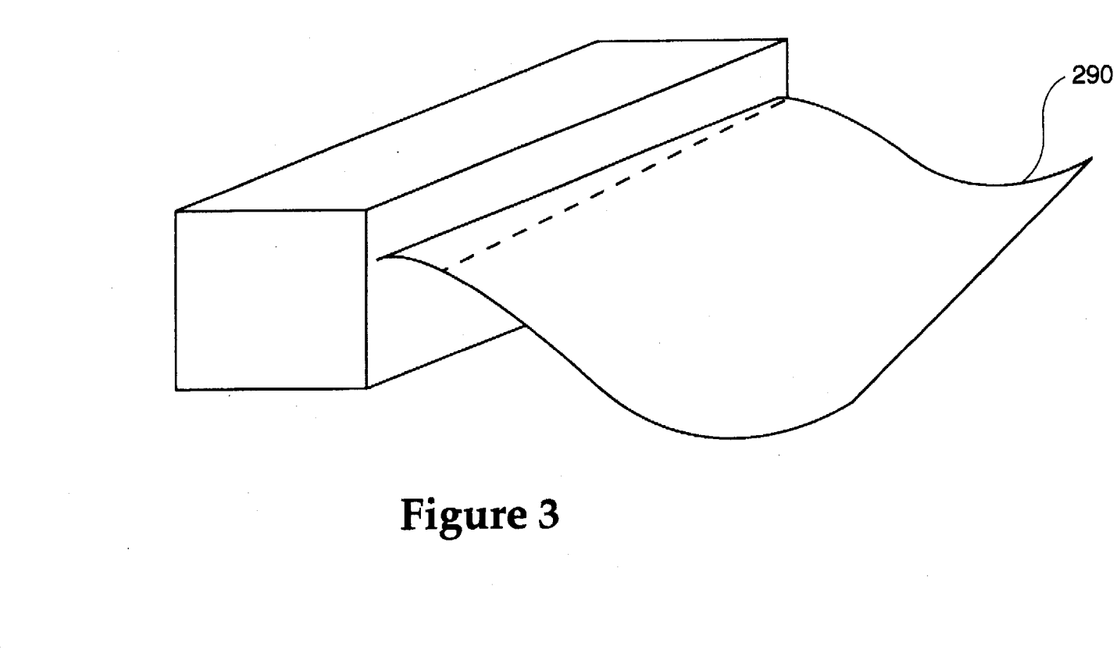
FIG. 3 is a perspective view of a first embodiment of the present invention.
Figure 4:
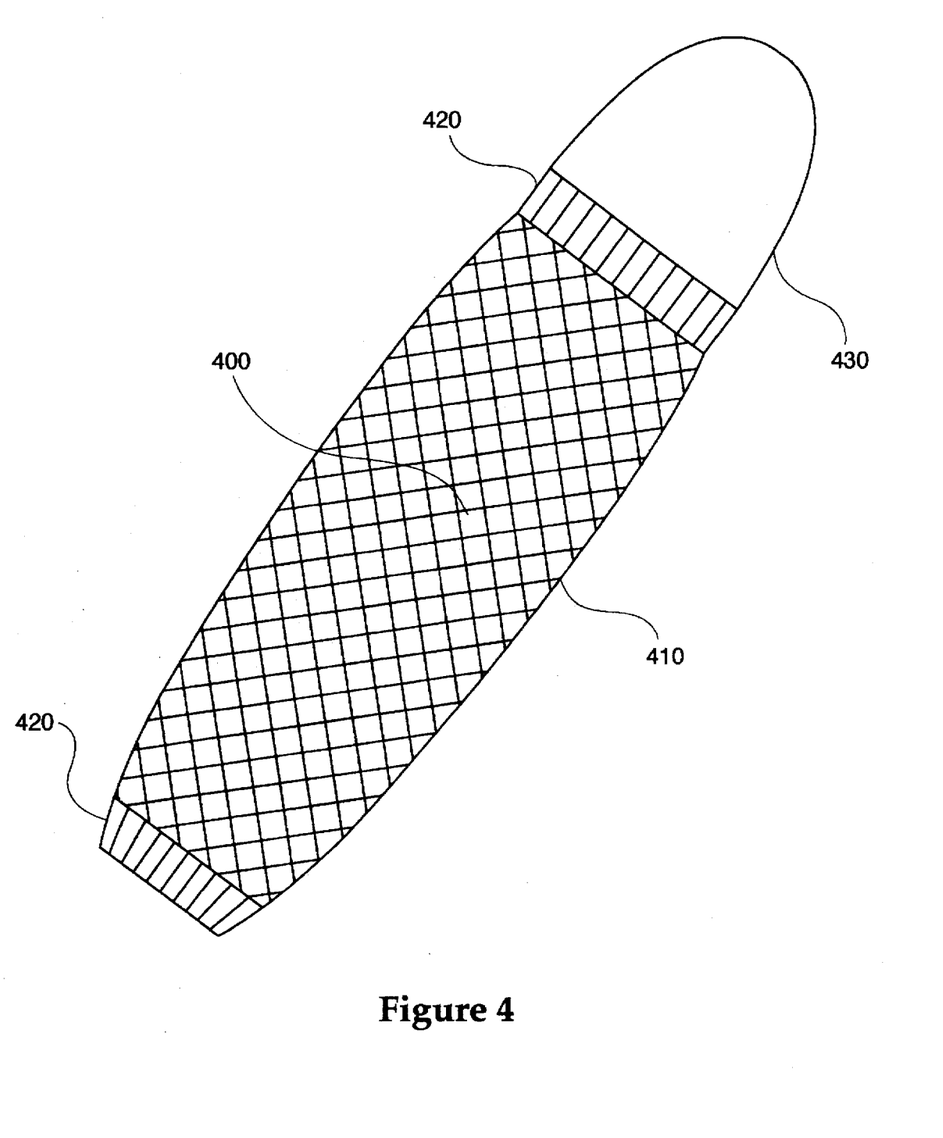
FIG. 4 is a perspective view of a second embodiment of the present invention.

FIGS. 3 and 4 illustrate two embodiments of the present invention as manufactured into consumer products. In FIG. 3, a sheet, known as a Fat-Free Wipeout™ may be provided in a roll packaged in a similar manner to a dryer sheet. Coated fabric substrate 290 may, in this embodiment, comprise a polypropylene or other artificial fiber spunbond material, treated in a single-step spray process and provided in a roll form, pre-perforated into eight inch by eight inch sheets. In use, a consumer may remove one or more sheets and submerge them into liquid foods (e.g., soups, gravies, and the like) to absorb excess oils, fats, and greases.

Once removed from the liquid food, the sheet may be disposed of or rinsed, dried, and reused. It is envisioned, however, that is may be more desirable to dispose of each sheet after each use. In another embodiment (not shown) smaller sheets, known as Fat-Free Wipettes™, may be folded and packaged into a small, portable pouch (much like a Kleenex™ brand tissue) and used by consumers in applications where large sheets are not desirable (e.g., restaurant or the like).

Coated fabric substrate 290 may also be applied for solid foods as well. Experiments with the sheets of FIG. 3 have shown them to have superior properties for absorbing greases when microwaving bacon or the like.

FIG. 4 illustrates an alternative embodiment of the present invention. In this alternative embodiment, a cotton gauze fabric 400 may be treated in a two step dip or spray process. Cotton gauze fabric 400 may be packaged for consumer use as individual sheets, or may be packed into a nylon netting 410 and heat sealed 420 into a conveniently sized pillow. Such a pillow may be sized to fit within a typical baster or the like to absorb greases, oils, fats, and the like while basting. Alternatively, such a pillow may be submerged in liquid food to absorb greases, fats,and oils. A string 430 may be provided to facilitate removal of the apparatus from a baster or from a food liquid.

TEST RESULTS

Several tests have been performed on the devices of the present invention to quantify fat, grease, and oil absorption performance versus prior art techniques. Samples of spunbond polypropylene, spunbond polyethylene, and cotton gauze, treated and untreated, were obtained, each 4.5 inches by 4.5 inches, weighing up to 2 grams apiece. Uniform amounts (approx 10 tablespoons or 140 grams) of oils of various types were added to 1500 ml of water placed in a 100 mm by 220 mm pyrex dish.

Temperatures were measured with a Weston immersion thermometer. When heating was required, the pyrex dish and sample were placed in a microwave, a pre-weighed fabric square was added to the oil/water mixture for approximately one minute with rapid stirring with tongs or fork. The fabric was removed and weighed and percent retention determined. The results of such testing are illustrated in Table I.

TABLE I

| TYPE OF FABRIC | TREATMENT | REMOVAL EFFICIENCY AT VARIOUS TEMPERATURES | | | | | |
|---|---|---|---|---|---|---|---|
| | | TEMPERATURE | | | | | |
| | | % Wt H$_2$O & Oil Recovered | | | % Wt Oil Recovered | | |
| | | 78° F. | 104° F. | 209° F. | 78° F. | 104° F. | 209° F. |
| GAUZE | UNTREATED | 525 | 652 | 663 | 30.9 | 204 | 250 |
| | TREATED | 1342 | 2308 | 1237 | 1294 | 2044 | 906 |
| SPUNBOND POLYETHYLENE | UNTREATED | 1165 | 1411 | 1565 | 174 | 487 | 362 |
| | TREATED | 1572 | 1746 | 1044 | 1528 | 1575 | 496 |
| SPUNBOND POLYPROPYLENE | UNTREATED | 1595 | 1525 | 757 | 929 | 710 | 209 |
| | TREATED | 2151 | 1678 | 812 | 2034 | 1460 | 486 |

As illustrated in Table I, in every instance, the treated fabrics absorbed significantly more oil than untreated fabrics. Moreover, the treated fabrics absorbed less water than their untreated counterparts. This latter property may preserve nutrients, flavorings, and nutrients in a food product, as these elements may be water soluble.

As illustrated in Table I, untreated cotton gauze has very good water absorption properties. At room temperature (78° F.) for example, untreated cotton gauze absorbs 525 percent of its weight in water and oil. Of this absorbed mixture, however, only 30.9 percent by weight is oil. Thus, the untreated cotton gauze absorbs mostly water. Treated cotton gauze, on the other hand, at 78° F. absorbs 1342 percent of its weight in water and oil, the bulk of which (1294 percent) comprises oil. Oil absorption properties are greatly enhanced and water absorption properties reduced by the treatment process of the present invention.

Artificial fibers may have more natural hydrophobic characteristics and thus absorb less water even when untreated. However, as illustrated in Table I, polypropylene, which has very good hydrophobic characteristics, is significantly enhanced by the treatment process of the present invention. Note, for example, that oil absorption of treated polypropylene is over double that of untreated polypropylene. Moreover, the amount of water absorbed is significantly reduced to an almost negligible amount. Thus, it appears that the treated fabrics of the present invention may provide much superior grease removal than the untreated fabrics of the prior art (e.g., Sohl discussed above).

Despite the hydrophobic nature of synthetic fabrics such as that used by Sohl, testing has shown that the capacity of such synthetic hydrophobic materials for absorption of fats, oils, and/or greases (FOG) is much reduced after contact with water. Thus, the hydrophobic FOG absorbing characteristics of hydrophobic fabrics like polypropylene in no way show the FOG absorbing efficiencies of the treated fabrics. The present invention provides for the absorption of FOG by use of hydrophobic fibrous substrate materials which retain their FOG absorbing efficiency.

Moreover, for fiber substrate materials which are not inherently hydrophobic (e.g., cotton gauze or the like), a great advantage of the process of the present invention is that it is possible to render the impregnated fibrous substrate sufficiently hydrophobic even when placed in contact with water for extended periods of tim. Impregnated fibers have been tested by immersing in water at various temperatures. The coated fibers will retain hydrophobic characteristics for 144 to 600 hours, depending on the temperature. In test performed, temperature was inversely proportional to the amount of time the fibers remained hydrophobic, and ranged from ambient (70°) to boiling (212°).

In comparison, uncoated cotton fibers will become saturated with water within 1–5 minutes of being immersed in water. Poly blends such as polypropylene, will become saturated with water within 12 hours of immersion. Thus, it appears that the coatings of the present invention interact with the fibers of the substrate to alter the underlying characteristics of the fibers, not merely coat them.

In addition, yet another advantage of the present invention is that water repellency is retained even after contact with certain organic solvents. Thus, in industrial applications, such as discussed below, coated fabric substrate 290 may be used to absorb FOG and then re-used by wringing FOG from the fabric, or by applying pressure or by extraction of FOG using a suitable organic solvent, thus enabling re-use of the coated fabric substrate 290. Again, this enhanced characteristic of coated fabric substrate 290 indicates that the coating(s) have reacted with the fibers of the fabric, is not a mere surface modification.

In addition to the Thompson's™ coating discussed above, applicant had discovered through experimentation that other commercially available compositions may be utilized as suitable coating materials. For example, a composition sold under the trade name Armor-All™ Waterproofing Sealer™, a petroleum base waterproofing coating, having a composition similar to the Thompson's™ product discussed above, may also be suitable as a coating material. In addition, a composition sold under the trade name DYCO™ First Seal 3000™, a water-based acrylic formulation, may also be a suitable coating material.

In addition, several other formulations have been discovered by the inventor to provide suitable hydrophobic and oleophilic characteristics when applied to a fabric substrate, as follows:

EXAMPLE #1

| Paraffin | 30 grams |
| Beeswax | 40 grams |
| Mineral Spirits | 30 grams |

The three components were mixed together with water into an emulsion and used to coat a fabric substrate. The water and mineral spirits were evaporated, leaving a coating of paraffin and beeswax on the fabric substrate.

EXAMPLE #2

| Paraffin | 75 grams |
| Japan Wax | 10 grams |
| Beeswax | 15 grams |
| Alcohol | 500 grams |

The four components were mixed together into a solution and used to coat a fabric substrate. The alcohol is evaporated, leaving a coating of paraffin, japan wax, and beeswax on the fabric substrate.

EXAMPLE #3

Groups of Soluble Waxes

These are waxes which are readily dispersible in hot water to form stable emulsions. Changing the composition generates different viscosities.

| Carnauba Wax | 90 grams |
| Oleic Acid | 10 grams |
| Trigamine (gum) | 10 grams |
| Caustic Soda (50%) | 6 grams |
| Water | 24 grams |

The five components are mixed in up to a 5:1 ratio with boiling water (e.g., add 4 more parts of water). The resultant mixture is used to coat a fabric substrate and the water component evaporated, leaving a coated fabric substrate. Other types of soluble waxes amy also be used.

EXAMPLE #4

| Paraffin wax | 50 grams |
| Stearic Acid | 14 grams |
| Trigamine (gum) | 7 grams |

The above mixture is dispersed in two parts of hot water and applied to a fabric substrate and the water component evaporated, leaving a coated fabric substrate.

EXAMPLE #5

| Sodium Silicate (resin) | 0.2 ounces |
| Sodium Hydroxide | 0.1 ounces |
| Starch | 7.0 ounces |
| Glycerin | 2.0 ounces |
| Sugar | 0.6 ounces |
| Water | 90 ounces |

The components are mixed together and applied to a fabric substrate and the water component evaporated, leaving a coated fabric substrate. The sodium hydroxide allows the composition to impregnate into the fibers of the fabric substrate. The starch acts as a wetting agent. Glycerine is used to make the resultant coating more pliable.

EXAMPLE #6

Polyfibers, Non-Cotton Fibers, and Synthetics

The preceding five examples may be applied to all types of fabrics and fibers discussed, both organic (e.g., cotton, cellulose, and the like) as well as polyfibers and other types of synthetics. The following example has been found to work especially well with polyfibers and other non-cotton fibers (i.e, synthetics).

| Zinc Oxide | 1.5 grams |
| Ammonium Carbonate | 5.0 grams |
| Sodium Hydroxide | 0.1 grams |
| Stearic Acid | 1.5 grams |
| Sodium Carbonate | 0.1 grams |

The resulting mixture may be added to water and used to coat fabric substrate. The water portion may be evaporated, leaving coated fabric substrate.

EXAMPLE #7

Resinous Materials

For purposes of waterproofing, mixtures of so-called commercial waterglass (sodium silicate solution) perform very well. These solutions may be commonly referred to as waterglass, as they are used in food processing to coat food products to prevent the entry of oxygen, bacteria, and other degrading and contaminating elements.

Mixtures diluted in a ratio of 1:4 (sodium silicate concentration to water) were found to work best for coatings using waxes. A commercially available solution, Thompson's™ Water Seal Ultra™, discussed above and disclosed in the Clark et. al. patent discussed above, may have a chemical composition similar to the following.

| | |
|---|---|
| Oxidized Starch | 40 grams |
| Micronized Wax | 8 grams |
| Paraffin Wax | 6 grams |
| Mineral Spirits or Naphtha | 50 grams |
| Deionized Water | 166 grams |
| Sodium Silicate (polysilicates) | 75 grams |

The mixture may be mixed with water to form an emulsion and applied to a fabric substrate. The water and solvent portion may be evaporated, leaving a coated fabric substrate.

In general, the hydrophobic oleophilic composition which is coated, impregnated or saturated, is a waterproofing solution similar to types used in waterproofing and water sealing. One preferred material is a coating or impregnating composition comprising an emulsion of a water immiscible liquid, such as paraffin and bees waxes, a water in soluble resin (e.g., sodium silicate), and a dispersing agent such as a hydrated starch or hydrated starch component. The coating material is water-repellant and oleophilic and comprises 90–95% drying oil (e.g., solvent naphtha) and 5–10% of a low density polymer polysiloxane such as sodium silicate.

The resulting solution will penetrate the fibers of the substrate and form a coating thereon and will dry after a period of time after the drying thinner has evaporated and the wax/resin mixture has setup.

When a sheet of saturated absorbent fabric is placed in a body of FOG, the water insoluble FOGs will absorb into the fabric substrate and the captured FOG can be reclaimed or disposed of.

Several fabric types have been used in the present invention, as discussed above. The following are examples of v various fabrics and fibers which may be applied in the present invention, along with their inherent water absorbing characteristics.

PGI Nonwovens
Code No. 143-15-31
Thermal bond polyester (18 gms/sq. meter)
(Hydrophilic Fabric)
PGI Nonwovens
Brand #6775
Polypropylene (33 gms/sq. meter)
(Hydrophobic Fabric)
DeRoyal Textile
Hermitex #300
TCK No. 88435
100% surgical Cloth
(Hydrophilic Fabric)
ReMay
Spunbond Polyester
2055W
(Hydrophilic Fabric)

Coated fabric substrate 290 may be incorporated into a novel apparatus for use in removing FOG in industrial processes. Prior art processes for removing FOG are known in the art and are described, for example, in *World Conference Proceedings on Edible Fat and Oils Processing: Basic Principles and Modern Processes*, David R. Erikson, Editor, american Society of Oil Chemists, Champaign, Ill., 1990 Edition, incorporated herein by reference.

Figure 5:
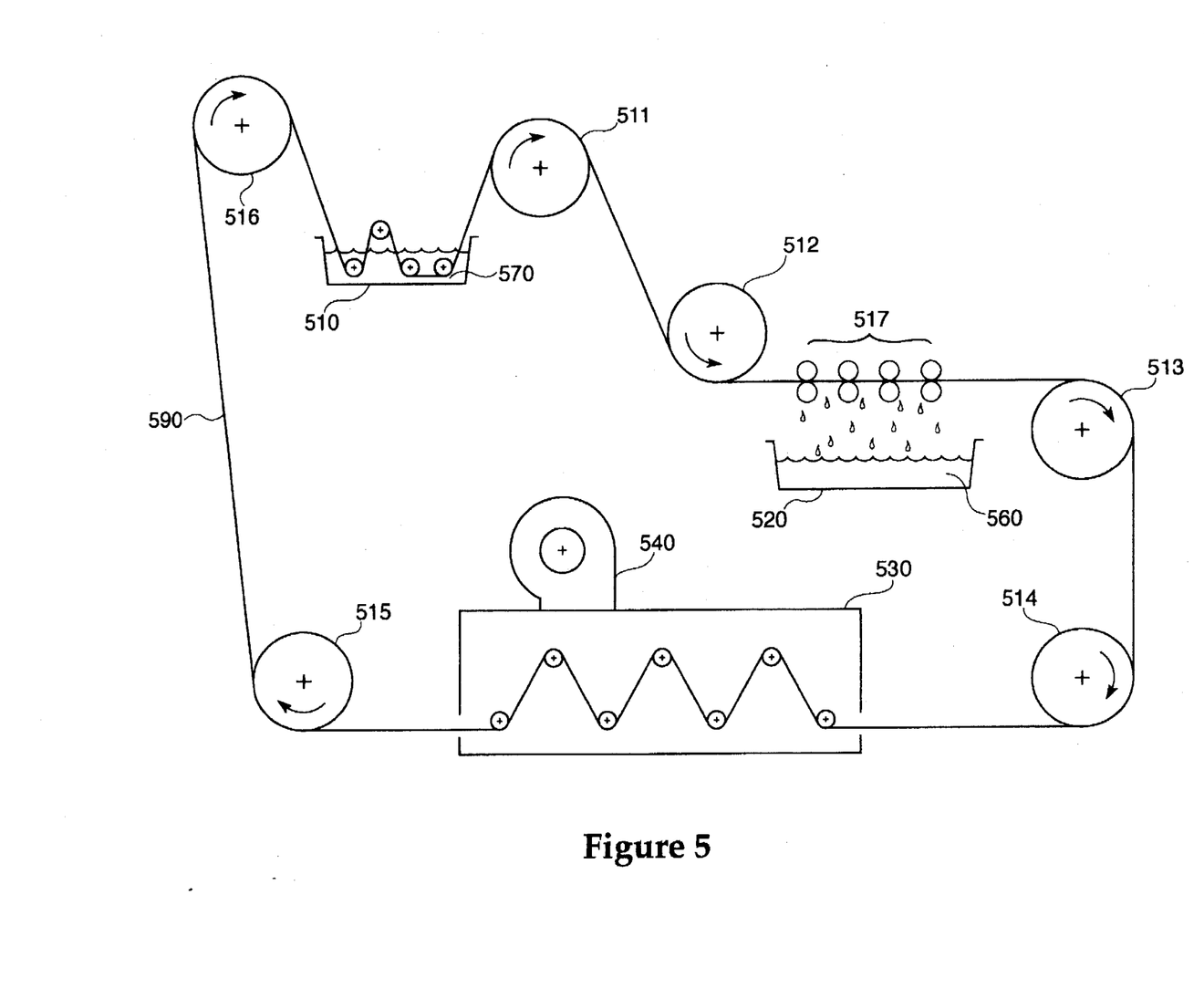
FIG. 5 is a diagram illustrating an industrial degreasing application for the coated fabric substrate of the present invention.

FIG. 5 is a diagram illustrating how coated fabric substrate 290 may be applied to an industrial degreasing, de-oiling, and/or fat removal process. Such a process may be used to remove FOG from food processes, or of removing greases and/or oils from industrial waste or other industrial processes. Moreover, the apparatus of FIG. 5 may be utilized to remove oils and the like from the environment (e.g., oil spill cleanup).

Referring now to FIG. 5, a continuous sheet of coated fabric substrate 590 may be provided as a continuous loop. Alternatively, coated fabric substrate 590 may be provided as a single long sheet, with supply and take-up rolls (not shown) provided to contain coated fabric substrate 590. In such an embodiment, fabric substrate 590 may be used to absorb FOG and then be wound up and taken to a remote facility for processing to remove the FOG and process coated fabric substrate 590 for later re-use.

However, in the preferred embodiment, as illustrated in FIG. 5, coated fabric substrate 590 may be provided in a continuous loop for continuous processing. Coated fabric substrate 590 may pass over feed roller 516 and into bath 510 containing liquid 570 which is contaminated with FOG. Coated fabric 590 may be positioned to skim the surface of liquid 570, or may be manipulated to pass through the surface of liquid 570 using feed rollers or the like, as illustrated in FIG. 5.

When coated fabric substrate 590 passed through liquid 570, FOG may be absorbed by coated fabric substrate 590. After passing over feed rollers 511, 512, coated fabric substrate 590 may pass through FOG extraction rollers 527. FOG extraction rollers 527 may pinch and squeeze coated fabric substrate 590 to remove FOG absorbed into coated fabric substrate 590. Extracted FOG 560 may then fall into bath 520 for collection and later reuse or disposal. In addition to extraction rollers 517, other means may be applied to remove FOG from coated fabric substrate 590. For example, a spray bath of water, organic solvent, emulsifier, or any mixture or the three may be applied to coated fabric substrate 590 in order to further remove FOG from coated fabric substrate 590. However, in the preferred embodiment, only extraction rollers may be required.

After passing over feed rollers 513 and 514, coated fabric substrate 590 may pass through optional drying chamber 530. As discussed above, one outstanding feature of the present invention is that the absorbent characteristics of coated fabric substrate 590 for FOG are virtually unaffected by the presence of water in coated fabric substrate 590. Thus drying chamber 530 is entirely optional and not used in the preferred embodiment. Drying chamber 540 may he provided with a fan 540 or the like to pass warm air over coated fabric substrate 590 to aid in drying.

Coated fabric substrate 590 passes over feed rollers 515 and 516 and returns to bath 510 to remove further FOG from liquid 570. Although illustrated here as containing two baths 510 and 520, it can be envisioned by one of ordinary skill in the art that the apparatus of FIG. 5 may be suitably applied in other environments as well. For example, the apparatus of FIG. 5 may be modified to remove oil spills from free standing water by allowing coated fabric substrate 590 to pass over the surface of such free standing water.

Testing of the apparatus of FIG. 5, has shown that ten or more consecutive extractions using an aromatic and oleophilic solvents do not apparently affect the hydrophobic and oleophilic characteristics of coated fabric substrate 590. In a test using a continuous mode, of over 150 hours of running time, no apparent loss of FOG removal efficiency was observed.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A device for absorbing fats, greases, and oils, comprising:

a fabric substrate;

a coating of hydrophobic material applied to the fabric substrate; and a coating of oleophilic material applied to the fabric substrate.

2. The device of claim 1, wherein said fabric substrate is selected from the group consisting of paper, paper products, paper toweling, gauzes, and cheesecloths.

3. The device of claim 1, wherein said fabric substrate comprises a material made from cellulose ethers.

4. The device of claim 3 wherein said fabric substrate comprises cellulose acetate.

5. The device of claim 1, wherein said fabric substrate comprises a material made from cellulose esters.

6. The device of claim 3 wherein said fabric substrate is selected from the group consisting of polyvinyl chloride, polyvinylidene chloride, polyethylene and polypropylene.

7. The device of any of claims 1, 2, 3, 4, 5, or 6, wherein said coating of oleophilic material comprises beeswax.

8. The device of any of claims 1, 2, 3, 4, 5, or 6, wherein said coating of hydrophobic material comprises paraffin.

9. The device of claim 1, further comprising a oleophilic resin layer applied to said fabric substrate.

10. A device for absorbing fats, greases, and oils, comprising:

a fabric substrate;

a coating comprising a mixture of at least one hydrophobic and at least one oleophilic material applied to the fabric substrate.

11. The device of claim 10, wherein said fabric substrate is selected from the group consisting of paper, paper products, paper toweling, gauzes, and cheesecloths.

12. The device of claim 10, wherein said fabric substrate comprises a material made from cellulose ethers.

13. The device of claim 12 wherein said fabric substrate comprises cellulose acetate.

14. The device of claim 10, wherein said fabric substrate comprises a material made from cellulose esters.

15. The device of claim 14, wherein said fabric substrate is selected from the group consisting of polyvinyl chloride, polyvinylidene chloride, polyethylene and polypropylene.

16. The device of any of claims 10, 11, 12, 13, 14, or 15, wherein said oleophilic material comprises beeswax.

17. The device of any of claims 10, 11, 12, 13, 14, or 15 wherein said hydrophobic material consists of paraffin.

18. The device of claim 10 further comprising an oleophilic resin layer applied to said fabric substrate.

* * * * *